US007191157B1

(12) United States Patent
Abe

(10) Patent No.: US 7,191,157 B1
(45) Date of Patent: *Mar. 13, 2007

(54) SYSTEM, METHOD AND COMPUTER PROGRAM PRODUCT FOR THE OPTIMIZATION OF PRICE TO SATISFY CERTAIN BUSINESS OBJECTIVES

(76) Inventor: John R. Abe, 1755 Frobisher Way, San Jose, CA (US) 95124

( * ) Notice: Subject to any disclaimer, the term of this patent is extended or adjusted under 35 U.S.C. 154(b) by 272 days.

This patent is subject to a terminal disclaimer.

(21) Appl. No.: 10/644,949

(22) Filed: Aug. 19, 2003

(51) Int. Cl.
*G06F 17/00* (2006.01)
(52) U.S. Cl. .................................... 705/400
(58) Field of Classification Search ............. 705/1, 705/7, 10, 26, 400
See application file for complete search history.

(56) References Cited

U.S. PATENT DOCUMENTS

| | | | |
|---|---|---|---|
| 5,377,095 A | 12/1994 | Maeda et al. | 364/401 |
| 5,459,656 A | 10/1995 | Fields et al. | 364/401 |
| 5,615,109 A | 3/1997 | Eder | 395/208 |
| 5,822,736 A | 10/1998 | Hartman et al. | 705/1 |
| 5,873,069 A | 2/1999 | Reuhl et al. | 705/20 |
| 5,878,400 A | 3/1999 | Carter, III | 705/20 |
| 5,918,209 A | 6/1999 | Campbell et al. | 705/5 |
| 5,987,425 A | 11/1999 | Hartman et al. | 705/20 |
| 6,029,139 A | 2/2000 | Cunningham et al. | 705/10 |
| 6,078,893 A | 6/2000 | Ouimet et al. | 705/10 |
| 6,094,641 A | 7/2000 | Ouimet et al. | 705/10 |
| 6,308,162 B1 | 10/2001 | Ouimet et al. | 705/7 |
| 6,553,346 B1 | 4/2003 | Walker et al. | 705/1 |
| 6,553,352 B2* | 4/2003 | Delurgio et al. | 705/400 |
| 7,043,449 B1* | 5/2006 | Li et al. | 705/36 R |
| 2002/0116348 A1* | 8/2002 | Phillips et al. | 705/400 |
| 2003/0217016 A1* | 11/2003 | Pericle | 705/400 |

FOREIGN PATENT DOCUMENTS

WO    WO 00/52605 A1 *  9/2000

OTHER PUBLICATIONS

Unknown Author, The Dynamic Pricing Solution, Aug. 2000, 18 pages.*
Office Action Summary from U.S. Appl. No. 10/652,640 which was mailed on Jan. 26, 2005.
Office Action Summary from U.S. Appl. No. 10/644,944 which was mailed on Dec. 8, 2004.
Office Action Summary from U.S. Appl. No. 10/652,640 which was mailed on Nov. 3, 2004.
Office Action Summary from U.S. Appl. No. 10/652,640 which was mailed on Aug. 11, 2005.
office Action Summary from Appl. No. 10/644,944 wich was mailed on Nov. 17, 2006.

* cited by examiner

*Primary Examiner*—Thomas A. Dixon
(74) *Attorney, Agent, or Firm*—Zilka-Kotab, PC

(57) ABSTRACT

A computer-implemented method, system and computer program product are provided for determining an optimal price. First, a plurality of parameters is received including, but not limited to a plurality of prices associated with a price-frequency mathematical distribution, a number of competitors, a business objective, and a cost associated with a good or service. Thereafter, an optimal price is calculated based on the input parameters.

30 Claims, 18 Drawing Sheets

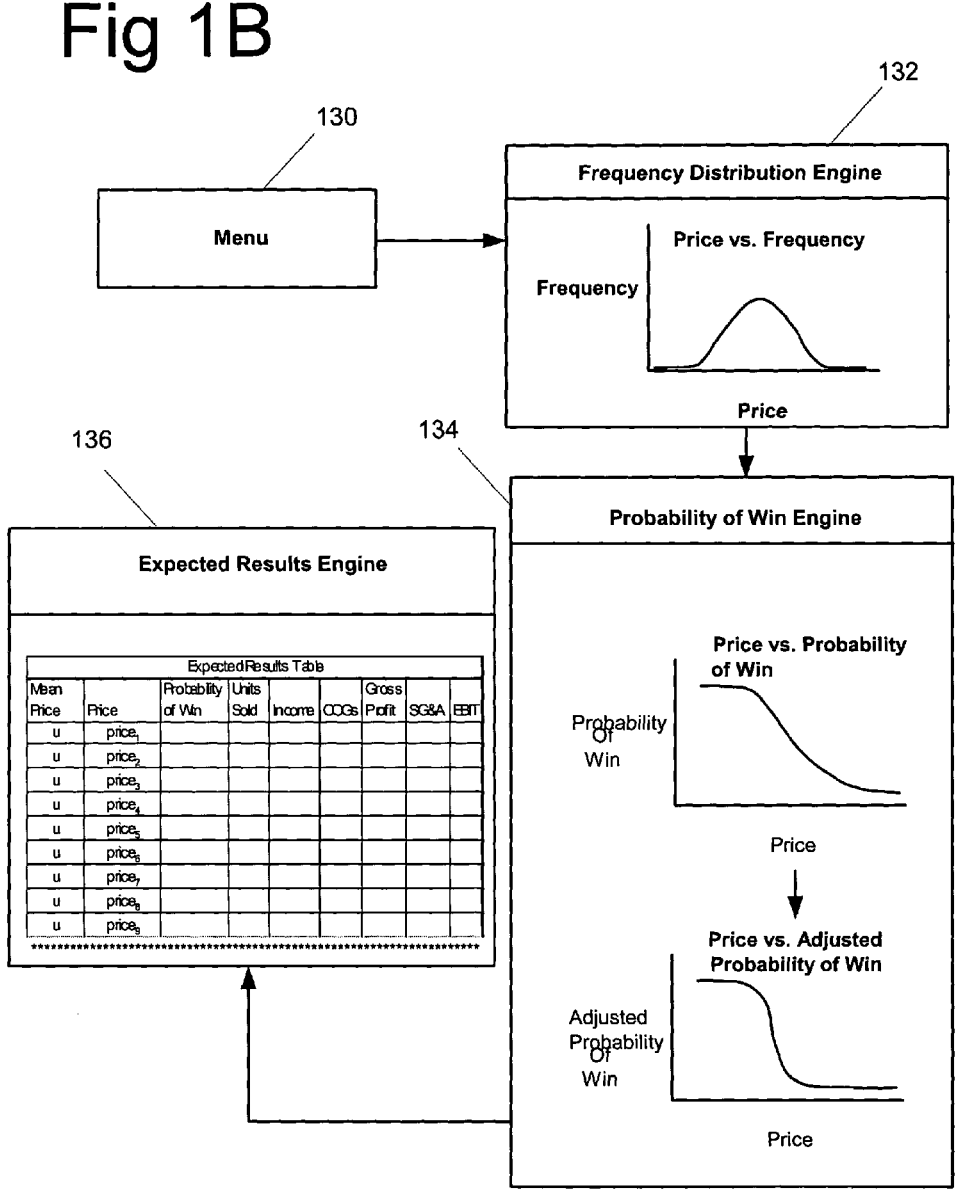

SYSTEM, METHOD AND COMPUTER PROGRAM PRODUCT FOR THE OPTIMIZATION OF PRICE TO SATISFY CERTAIN BUSINESS OBJECTIVES

FIELD OF THE INVENTION

The present invention relates to computer-implemented systems that optimize the price for a supplier to meet certain business objectives.

BACKGROUND OF THE INVENTION

A supplier who competes in a market with one or more competitors is faced with the challenge of pricing their goods and services. With a correct understanding of the market's responsiveness to price as well as the supplier's cost, a supplier can determine the optimal price that ensures meeting one or more of the following business objectives; a) Maximizing revenue, b) Maximizing Gross Profit, c) Maximizing Earnings Before Income Tax, d) Market share, e) Factory utilization, and more.

Prior art has limitations that prevent a supplier from making useable estimate of the optimal price. The limitations stem from inaccuracies and potentially incorrect assumptions associated with the demand or yield curve, which depicts the relationship between quantity and price. These inaccuracies are the result of one or more of the following problems; a) Limited span in sales order data in which to build the demand curve, b) Lack of statistically relevant sales order data, c) Lack of market relevant sales order data, d) Implicit assumption that the historical and future sales environments remain the same.

The demand curve is typically constructed using the supplier's historical sales order data, which limits the extent and completeness of the demand curve. For example, if the supplier behaves as the "low price leader", the sales order data can only be used to create a demand curve reflecting how the market responds to low pricing.

The demand curve should depict the market's responsiveness to all pricing scenarios, not just those scenarios previously employed by the company. As a result of using a demand curve constructed using a limited span of sale order data, it is not likely that the optimum price can be determined.

Another challenge in constructing the demand curve is the lack of statistically relevant data. Frequently, there are pieces of sales data which conflict. An example is that one customer was willing to pay $2.23 each for 10,000 units. Another customer, in the identical customer group may demand 11,500 units for $2.23 each, a 15% difference in quantity. This situation is not unusual, especially for opaque markets where one buyer does not see what other buyers are paying and therefore facilitates a supplier charging different unit prices for the same goods or services. The prior art attempts to resolve this situation through averaging algorithms and requires sufficient sale order data for statistical relevance. The challenge is that there is seldom sufficient data to build a statistically relevant demand curve.

Yet another challenge with the prior art is that even if the demand curve is statistically relevant, it is not market relevant. Statistical relevance can be assured through a large enough set of sales orders. However, collecting a large set of sales orders may necessitate waiting long periods of time to allow a sufficient number of orders to be accumulated for statistical relevance. During the long collection period, the market may have changed considerably in its responsiveness to pricing. So while the demand curve may have statistical relevance, it is meaningless because it is based on data too old for market relevance. As a consequence, determining an optimum price based on a dated demand curve is unlikely.

In the prior art, there is an implicit assumption that the historical sales and future sales environments are identical. For example, if the derived demand curve indicates that 10,000 units were sold when the price was $3.25, the expectation going forward is that the supplier will again sell 10,000 units at $3.25. The implicit assumption is that the overall economic environment, the supplier's approach to marketing, and selling methodology has remained the same. Rarely do the economic environment, the supplier's marketing, and selling methodologies remain intact for any length of time. As a consequence, the validity of the demand curve is questionable and its usefulness in doubt.

Without a representative demand curve, it is impossible to determine an optimum price that ensure meeting one or more of the following business objectives; a) Maximizing revenue, b) Maximizing Gross Profit, c) Maximizing Earnings Before Income Tax, d) Market share, e) Factory utilization, etc.

In accuracies and poor assumption aside, once a demand curve is created, the supplier can make a determination of how to price their goods and services in order to satisfy certain business objectives. With an understanding of the relationship between quantity and price, an income statement, as well as additional metrics, can be constructed for each price through the following steps; a) Calculation of revenue by multiplying the price and quantity, b) Determination of the cost-of-goods by multiply the quantity and unit cost at that quantity, c) Calculation of gross profit by subtracting the cost-of-goods from the revenue, d) Determining the sales and general administration costs, e) Calculating the earnings before income tax by subtracting the sales and general administration costs from the gross profit, f) Calculation of market share by dividing the quantity by the total quantity sold by all suppliers, and e) Calculating factor utilization by dividing the units sold by the capacity of the factory for that product.

Once the income statement and additional metrics are calculated for each price, the optimum price can be selected to satisfy various business objects. For example, the supplier may wish to optimize pricing to maximize revenue. To identify the optimum price that maximizes revenue, the income statements are searched to identify where the revenue is maximized and the associated price extracted.

In addition to optimizations with one objective in mind, optimizations are possible that maximize the multiple business objectives. For example, the supplier may wish to optimize pricing to maximize revenue and gross profit. In this example, the income statements are searched for the price at which revenue is maximized and the price at which gross profit is maximized. The supplier then selects a price between the maximum gross profit and revenue price that represents the best tradeoff between these two business objectives.

DISCLOSURE OF THE INVENTION

A computer-implemented method, system and computer program product are provided for determining an optimal price. First, a plurality of parameters is received including, but not limited to a plurality of prices associated with a price-frequency mathematical distribution, a number of competitors, a business objective, and a cost associated with a good or service. Thereafter, an optimal price is calculated based on the input parameters.

BRIEF DESCRIPTION OF THE DRAWINGS

FIG. 1B is a diagram showing the major processing engines.

DESCRIPTION OF THE PREFERRED EMBODIMENTS

The following description is present to enable one of ordinary skill in the art to make and use the present embodiment and is provided in the context of a patent application and its requirements. Various modifications to the illustrated embodiment will be readily apparent to those skilled in the art and the generic principles herein may be applied to other embodiments. Thus, the present embodiment is not intended to be limited to the embodiment shown but is to be accorded the widest scope consistent with the principles and features described herein.

Figure 1A:
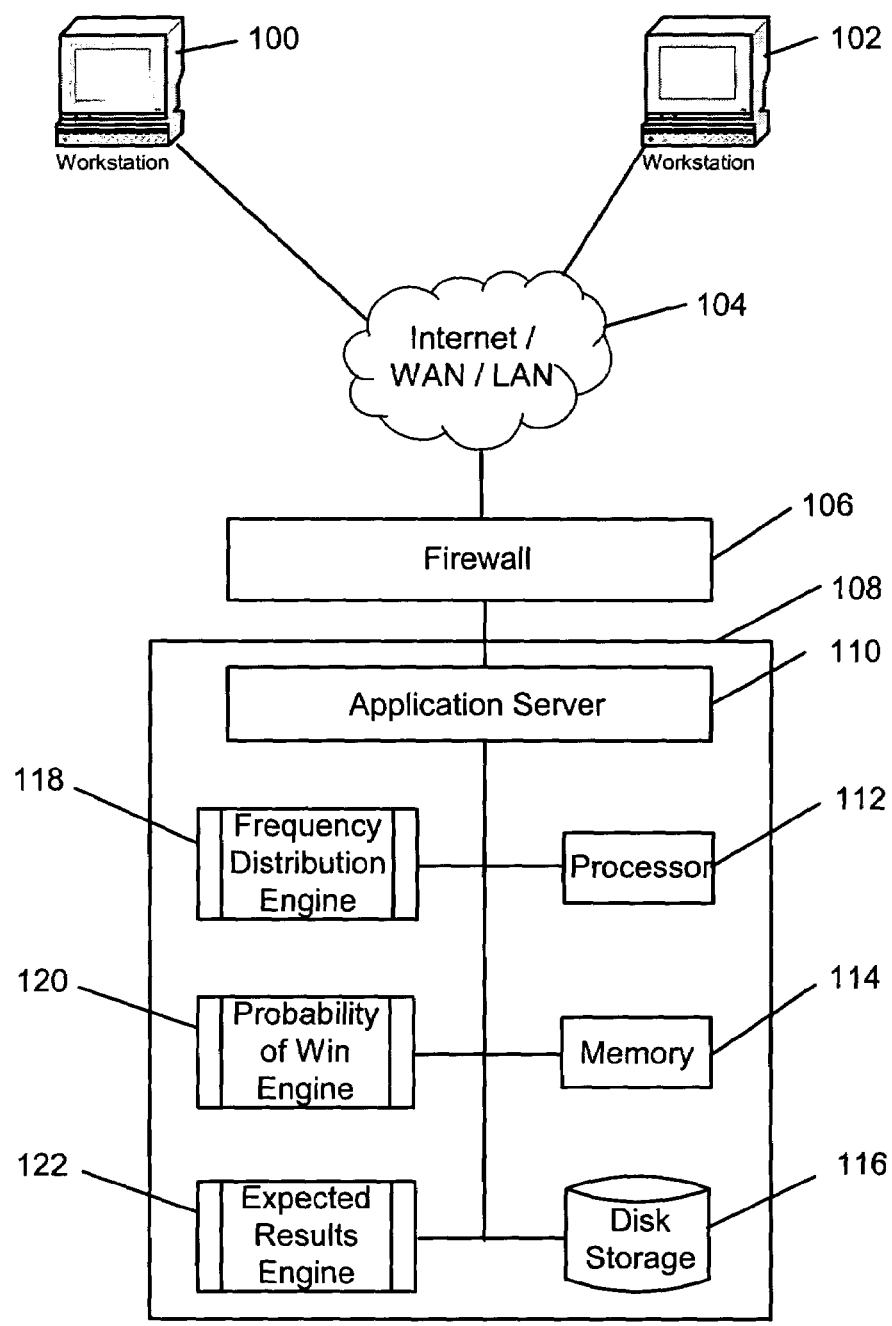
FIG. 1A is a diagram of a general-purpose computer system used in one embodiment.

As shown in FIG. 1A, a system includes one input/display device 100 or multiple input/display devices 102 such as a computer workstation that a user enters commands, inputs data, and views computed results; a connection to the Internet/WAN/LAN 104 that uses TCIP protocol; a firewall 106; a server or other such computing device 108 consisting of an application server 110, a processor 112, random access memory 114, and disk storage 116.

The memory 114 and disk 116 will store a Frequency Distribution Engine 118 that calculates the number of offers for the subject goods and services that the user believes competitors are offering in a particular market. In addition the memory 114 and disk 116 store the Probability of Win Engine 120, which calculates the probability that the user will receive a sale when the subject goods and services are priced at a specific value, and a Expected Results Engine 122 that calculates the anticipated revenue, gross profit, and earnings before income tax (EBIT) for each price.

It will be understood that the described embodiments are embodied as computer instructions stored in memory 114 and executed by processor 112. These instructions can also be stored on a computer readable media such as a floppy disk, CD ROM, etc. and can also be transmitted via a network such as the internet, an intranet, etc., via a carrier wave embodying the instructions.

FIG. 1B shows the major processing engines, Frequency Distribution Engine 132, Probability of Win Engine 134, and Expected Results Engine 136. The Frequency Distribution Engine 132, computes and stores a frequency distribution of prices in a table based received by Menu 130. The Probability of Win Engine 134, computes and stores the probability of a customer purchasing the subject good or service in a table based on the frequency distribution of prices. The Probability of Win Engine 134, adjusts and then stores the probability of a customer purchase based on the number of competitors received by the Menu 130. Using the adjusted probability of a customer purchase and values received by Menu 130, the Expected Results Engine 136 calculates the units sold, income, cost of goods, gross profit, sales general & administrative expense, and earnings before income tax for each price and mean price and stores the result in a table. The table created by the Expected Results Engine 136 is searched for the optimum price that optimizes the business objective designated by Menu 130.

Figure 2:
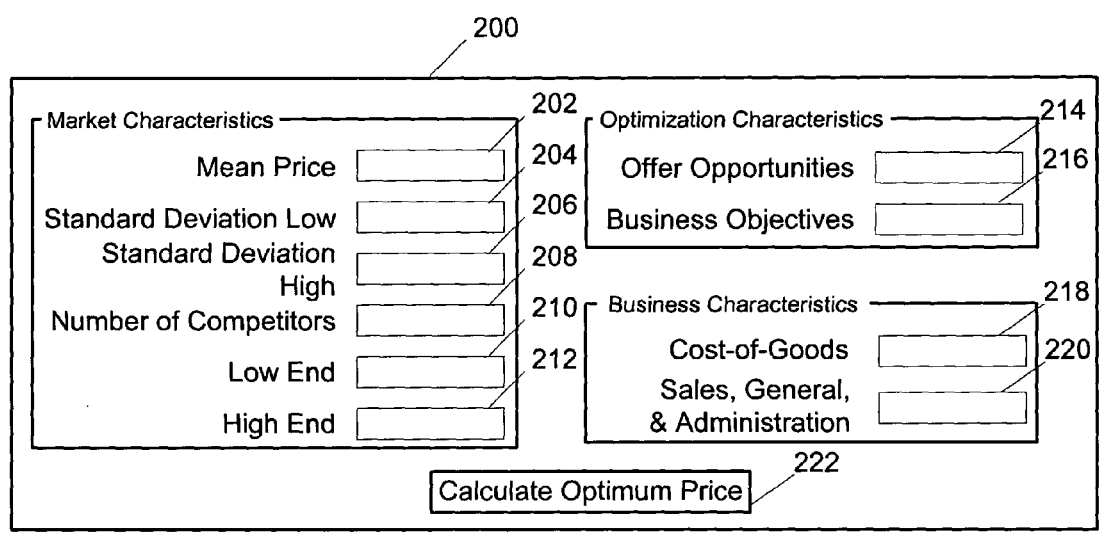
FIG. 2 is an input menu on the display device.

As shown in FIG. 2, a user who wishes to meet a certain business objective, such as maximizing revenue, maximizing gross profit, or maximizing earnings before income tax for specific goods or services is shown a menu 200 on an input/display device. The user enters in parameters that describe the frequency distribution of the number of offers verses price in a designated market as well as the number of competitors. The user enters in an estimated mean price into the Mean Price Field 202, the standard deviation low into the Standard Deviation Low Field 204, the standard deviation high into the Standard Deviation High Field 206, the number of competitors in the Number of Competitors Field 208, the beginning of the frequency distribution in the Low End Field 210, and the end of the frequency distribution in the High End Field 212.

The use of a frequency distribution of pricing to estimate the market has distinct advantages over prior art. These advantages are summarized as follows;

a. Enables a broad and complete estimate of the market that that ensures the optimal price can be selected based on business objectives. While prior art can potentially optimize price for a given set of market data, typically that market data is extremely limited in scope.

b. Eliminates the lack of statistical significance problem of prior art.

c. Eliminates the potential of lack of market relevance associated with prior art.

d. Allows the accounting of micro-economic conditions such as oversupply verse demand, undersupply vs. demand, and supply equal to demand that may not be depicted in prior art.

The user continues the configuration of the system by entering the number of offer opportunities that is anticipated to occur in a given time period in the Offer Opportunities Field 214, the business objective in the Business Objective Field 216, the cost-per-unit in the Cost-of-Goods Field 218, and the SG&A cost in the Sales & Administration Field 220.

On completing the entry on data into the menu 200, the user initiates the calculation of the optimum price by activating the Calculate Optimum Price button 222.

Figure 3A:
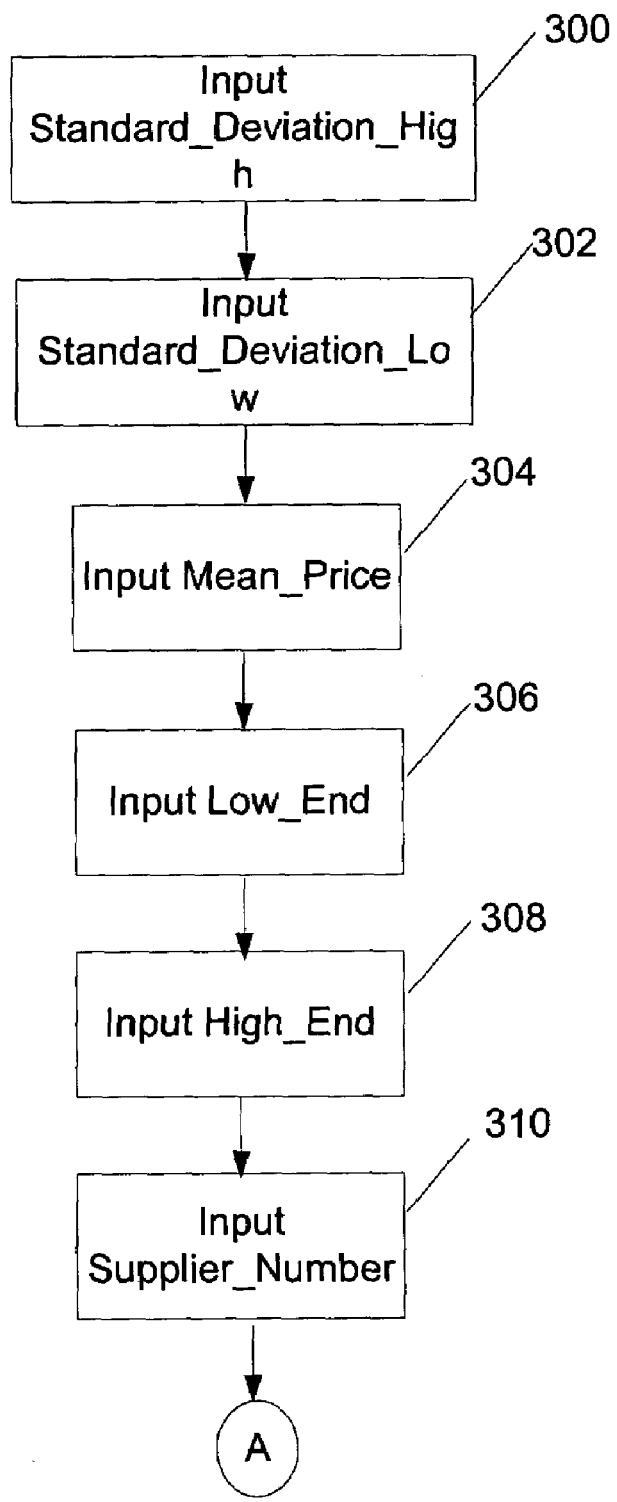
FIG. 3A is a flow chart illustrating the input of data.

FIG. 3A shows the flow chart describing the input of data into the routine that is initiated by activating the Calculate Optimum Price button 222. Input and assignment of standard deviation high to variable Standard_Deviation_High is accomplished in 300. Input and assignment of standard deviation low to variable Standard_Deviation_Low is accomplished in 302. Input and assignment of mean price to variable Mean_Price is accomplished in 304. Input and assignment of low end to variable Low_End is accomplished in 306. Input and assignment of high end to variable High_End is accomplished in 308. Input and assignment of the number of competitors to variable Supplier_Number is accomplished in 310.

Figure 3B:
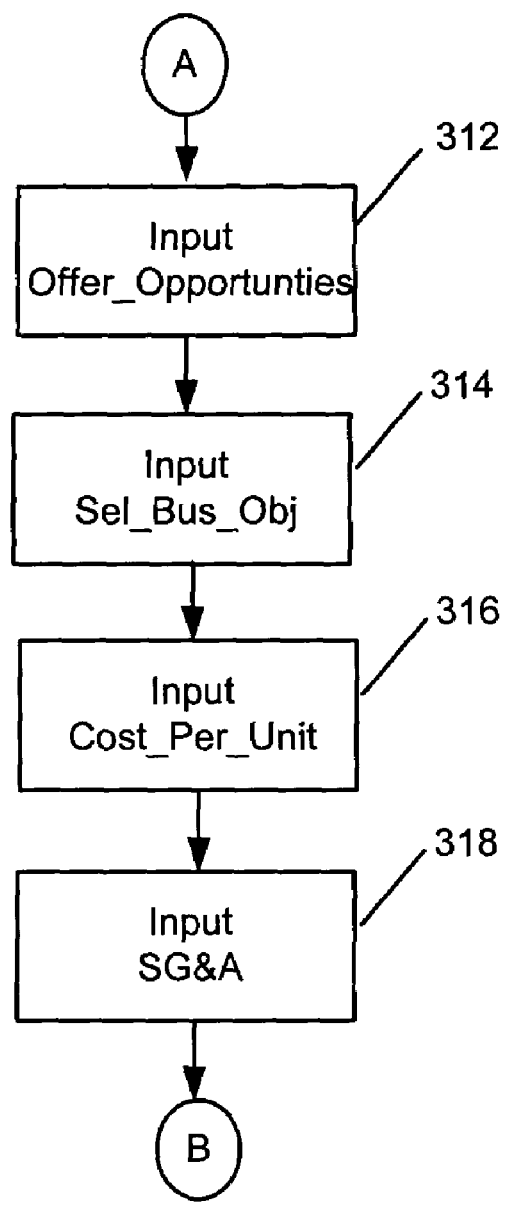
FIG. 3B is a flow chart illustrating the input of data.

FIG. 3B shows the continuation of the flow diagram describing the input of data into the routine. Input and assignment of offer opportunities to variable Offer_Opportunities is accomplished in 312. Input and assignment of the business objective to variable Sel_Bus_Obj is accomplished in 314. Input and assignment of the cost-of-goods to variable Cost_Per_Unit is accomplished in 316. Input and assignment of sales, general, and administration expenses is accomplished in 318.

Figure 4A:
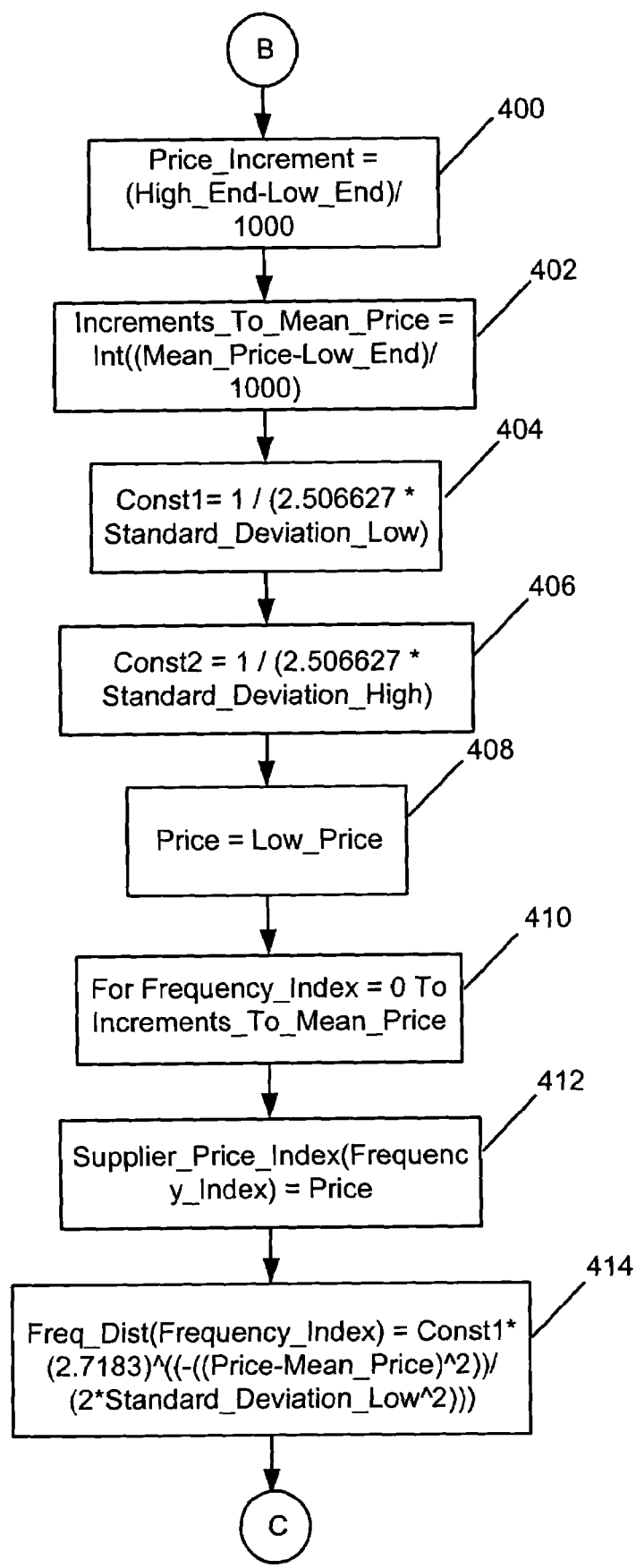
FIG. 4A is a flow chart illustrating the creation of the Frequency Distribution Array.

FIG. 4A begins the flow diagram of the Frequency Distribution Engine 118 reference in FIG. 1. The Frequency Distribution Engine 118 calculates an estimate of the distribution of market prices the menu 200 inputs describing the market. In the preferred embodiment of the Frequency Distribution Engine 118, the distribution curve is represented by a modified normal distribution such that the distribution to the left of the mean price is characterized by a normal distribution having a standard deviation than the distribution to the right of the mean. In this embodiment, the use of a modified normal distribution is computationally expedient. However alternative embodiments may employ other mathematical functions such as a Lagrange Polynomial. Yet another alternative embodiment may simply be a manual determination of a distribution of points.

The Frequency Distribution Engine 118 flow diagram begins by determining the number of price increments represented by Price_Increment 400 contained in the range of the frequency distribution, as well as the number of increments from the low end to the mean price represented by Increments_To_Mean_Price 402. The values for variables Const1 404 and Const2 406 are calculated. The value of Price 408 is initialized. A programming loop 410 is established that increments Frequency_Index 410 in single steps to Increments_To_Mean_Price 410 plus one. The value of variable Price 408 is stored in Supplier_Price_Index 412. The Frequency Distribution for the given variable Price 408 is calculated and stored in an array called Freq_Dist 414.

Figure 4B:
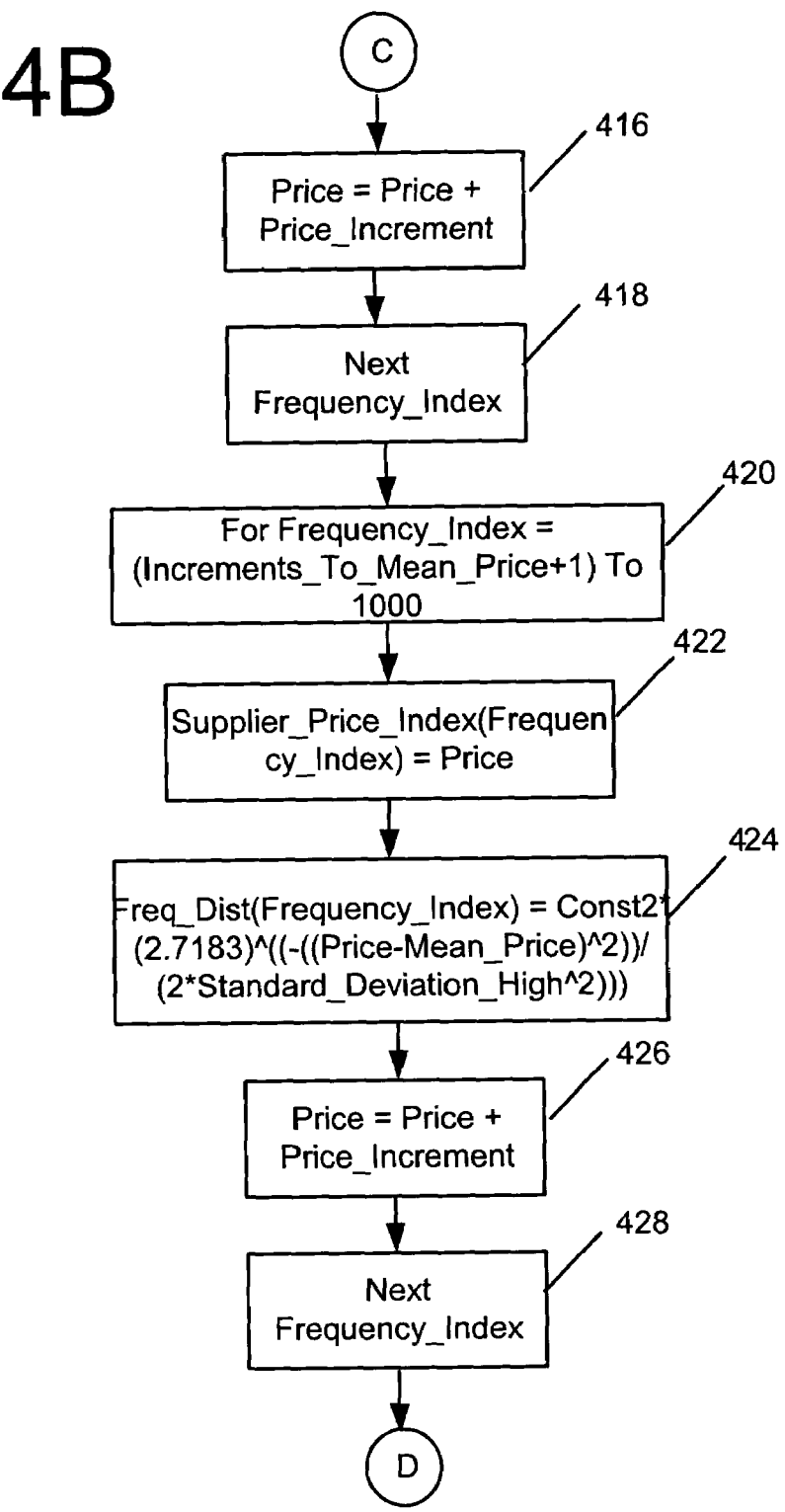
FIG. 4B is a flow chart illustrating the creation of the Frequency Distribution Array.

FIG. 4B shows the continuation of the flow diagram describing the Frequency Distribution Engine 118 referenced in FIG. 1. The next value for the variable Price 408 is calculated in 416. The Frequency_Index 418 is increment and the instruction in the loop 410 repeated until the value of Frequency_Index 410 is equal to one plus Increments_To_Mean_Price 410. A programming loop is established that increments Frequency_Index 420 from the value of Increments_To_Mean_Price 420 plus one in steps of one to 1000 plus one. The Supplier_Price_Index 422 array is set to the value contained in the variable Price 422. The value for Freq_Dist 424 array is calculated. The value of Price 426 is incremented by the value of Price_Increment 426. The Frequency_Index 428 is incremented and the instructions in programming loop 420 repeated until the value of Frequency_Index 420 is equal to one plus 1000.

Figure 5A:
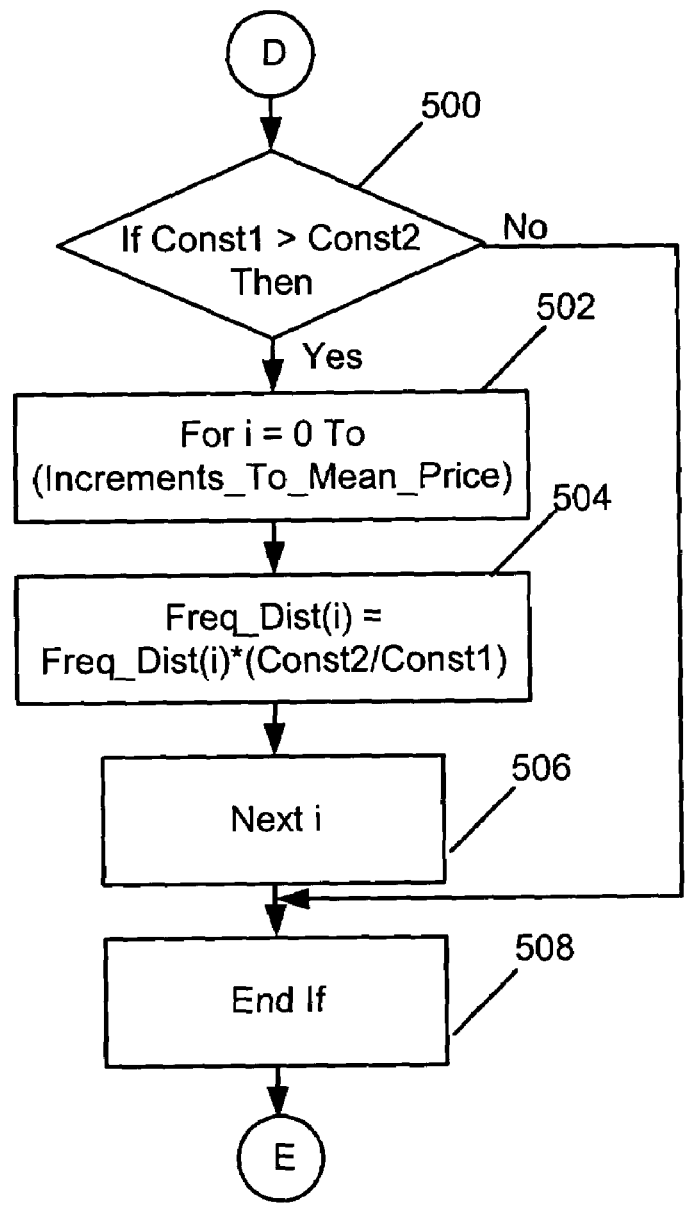
FIG. 5A is a flow chart illustrating the smoothing data in the Frequency Distribution Array.

FIG. 5A shows the flow diagram that is the continuation of the Frequency Distribution Engine 118 referenced in FIG. 1 and relates to the normalization of the two halves of the distribution curve. The normalization begins with a determination 500 of whether Const1 500 is larger than Const2 500. If it the determination 500 is true, then a programming loop 502 is initiated where i 502 is initialized to zero and incremented by one to a value of Increments_To_Mean_Price 502 plus one. The value stored in the array Freq_Dist (i) 504 is multiplied by the ratio of Const2 504 divided by Const1 504 and restored in Freq_Dist(i) 504. Then the value of i 506 is incremented and the loop 502 repeated. The completion of determination 500 is indicated by 508.

Figure 5B:
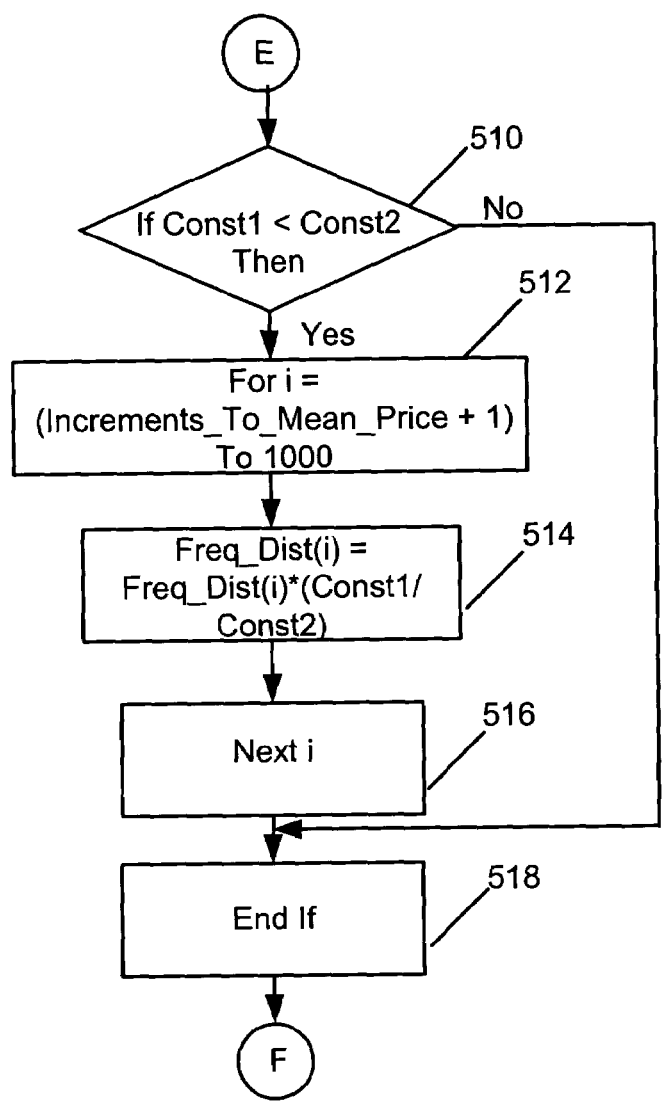
FIG. 5B is a flow chart illustrating the smoothing of data in the Frequency Distribution Array.

FIG. 5B shows the flow diagram that is the continuation of the Frequency Distribution Engine 118 referenced in FIG. 1 and relates to the smoothing or joining of the two halves of the distribution curve. If the determination 500 FIG. 5A is false, then a second determination 510 of whether Const1 510 is less than Const2 510. If the determination 510 is true, then a loop 512 is established where i 512 is initialized to a value of Increments_To_Mean_Price 512 plus one and stepped by increments of one. The value stored in the array Freq_Dist(i) 514 is multiplied by the ratio of Const2 514 divided by Const1 514 and restored in Freq_Dist(i) 514. The value of i 516 is incremented and the loop 512 repeated. The completion of determination 510 is indicated by 518. If the determination of 510 is false, then the routine proceeds to the steps shown on FIG. 6.

The Probability of Win Engine 120 referenced in FIG. 1 calculates the probability of a customer purchasing a subject good or service based on a factor called Offer Opportunities. Specifically, Offer Opportunities define the number of customers that are exposed to a specific offer to sell said good or service at a designated price. The Probability of Win Engine 120 overcomes disadvantage of the prior art by eliminating the assumption that a good or service priced at a specific value will yield a predictable amount of sales regardless of the number of customers that were exposed to the specific offer to sell said good or service at a designated price. For programming expediency, the Probability of Win Engine 120 is embedded in the Expected Results Engine 122.

Figure 6:
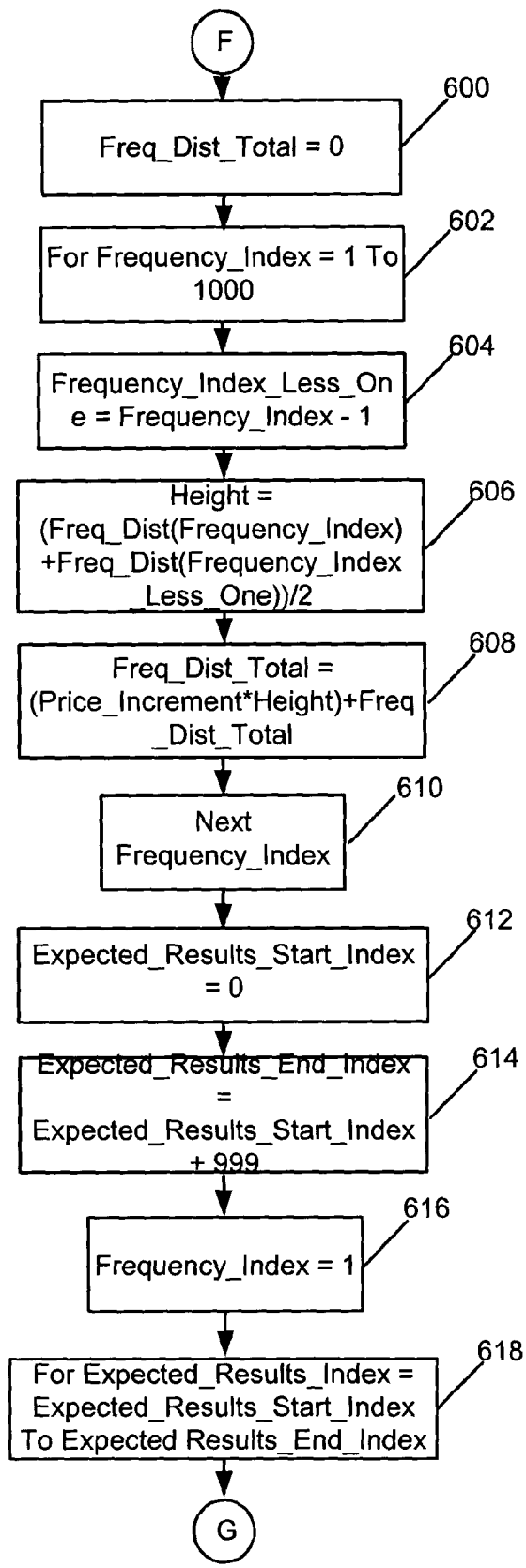
FIG. 6 is a flow chart illustrating the creation of the Expected Results Array.

FIG. 6 shows the flow diagram that is part of the Expected Results Engine 122 referenced in FIG. 1. Freq_Dist_Total 600 is set to zero. The loop 602 is used to integrate the values defined by the first and last array element, as defined by loop 602, of the Frequency Distribution. Loop 602 is established where Frequency_Index 602 is initialized to one and incremented in steps of one to 1000. Frequency_Index_Less_One 604 is calculated. The variable Height 606 is calculated by taking the average of two adjacent values of array Freq_Dist 606 for a given value of Frequency_Index 604. Freq_Dist_Total 608 is calculated by multiplying the Price_Increment 608 by the Height 606 and summing to the previous values of Freq_Dist_Total 608. The next Frequency_Index 610 is calculated by incrementing Frequency_Index 610 by one. The loop 602 is repeated until Frequency_Index 604 equals 1001.

On completion of the loop 602, the value of Expected_Results_Index 612 is set to zero. The value of Expected_Results_End_Index 614 is calculated. The value of Frequency_Index 616 is set to one. Loop 618 is established where the value of Expected_Results_Index 618 is set to the value of Expected_Results_Start_Index 618 and is incremented by one until Expected_Results_End_Index 618 is reached.

Figure 7:
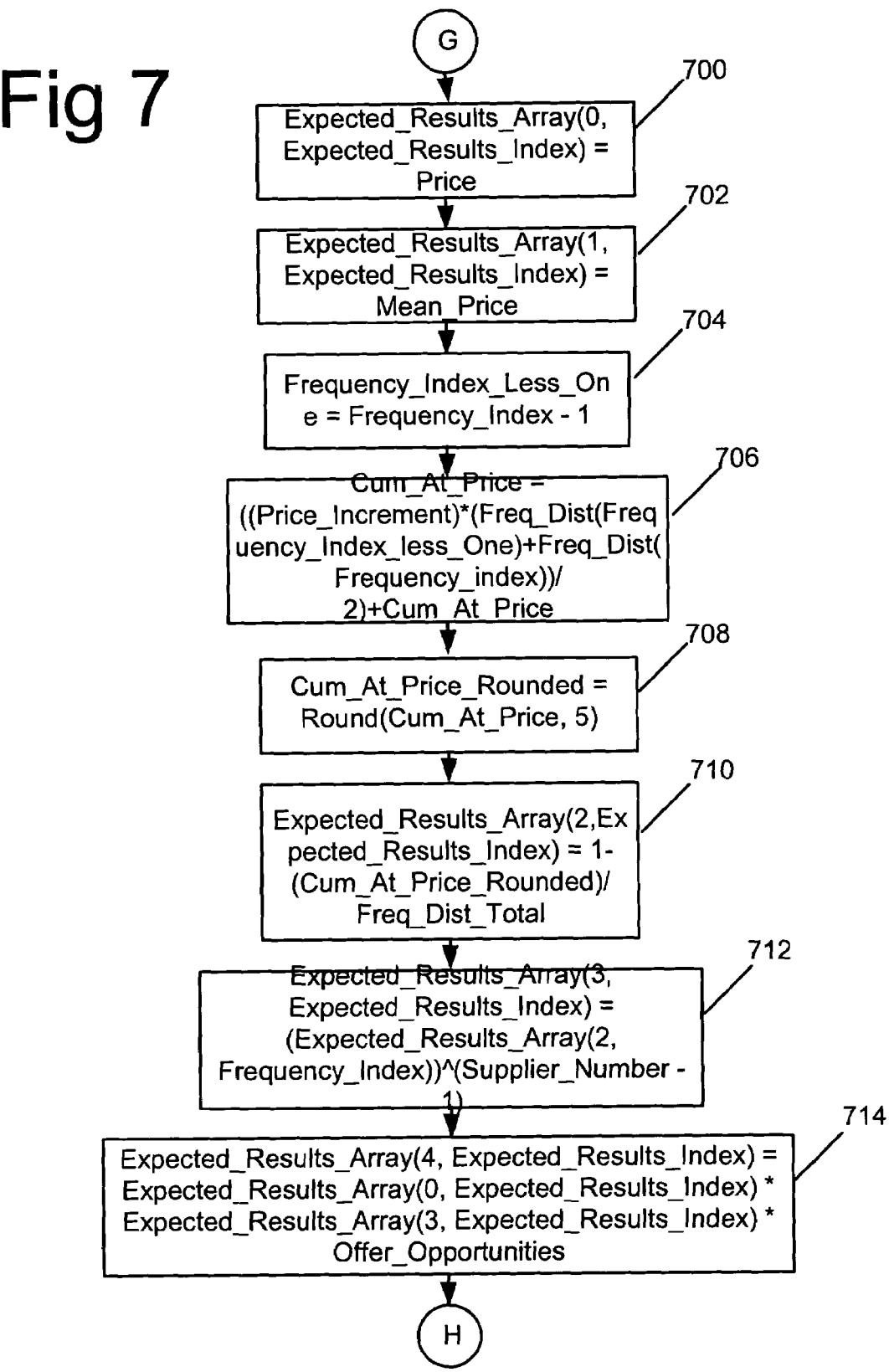
FIG. 7 is a continuation of the flow chart illustrating the creation of the Expected Results Array.

FIG. 7 shows the continuation of the flow diagram that is part of the Expected Results Engine 118 referenced in FIG. 1. The Price 700 is stored in the Expected_Results_Array 700 column zero. The Mean_Price 702 is stored in the Expected_Results_Array 702 column one. The value for Frequency_Index_less_One 704 is calculated. The value of Cum_At_Price 706 is calculated and depicts the integral of the frequency distribution up to the current Frequency_Index 706. The value for Cum_At_Price_Rounded 708 which represents the integral from the value Low_End 306 to the current value of Price 700 is calculated and rounded. The value for Expected_Results_Array 710 column two is calculated and depicts the probability of win with one competitor. The value for Expected_Results_Array 712 column three is calculated and depicts the probability of win with for more than one supplier. The value for Expected_Results_Array 714 column four is calculated and depicts the anticipated revenue for a specific price based on the number of offer opportunities.

The incorporation of the number of suppliers in the market represents a significant advantage over prior art because there is not the assumption that the number of competitors at the time the yield curve was constructed remained the same. Particularly in global Patent markets, the number of competitors can change in a relatively short time frame which can potentially invalidate the yield curve. By quantifying and integrating the number of suppliers in the subject market, a more accurate and reliable determination of the optimum price can be made.

Figure 8:
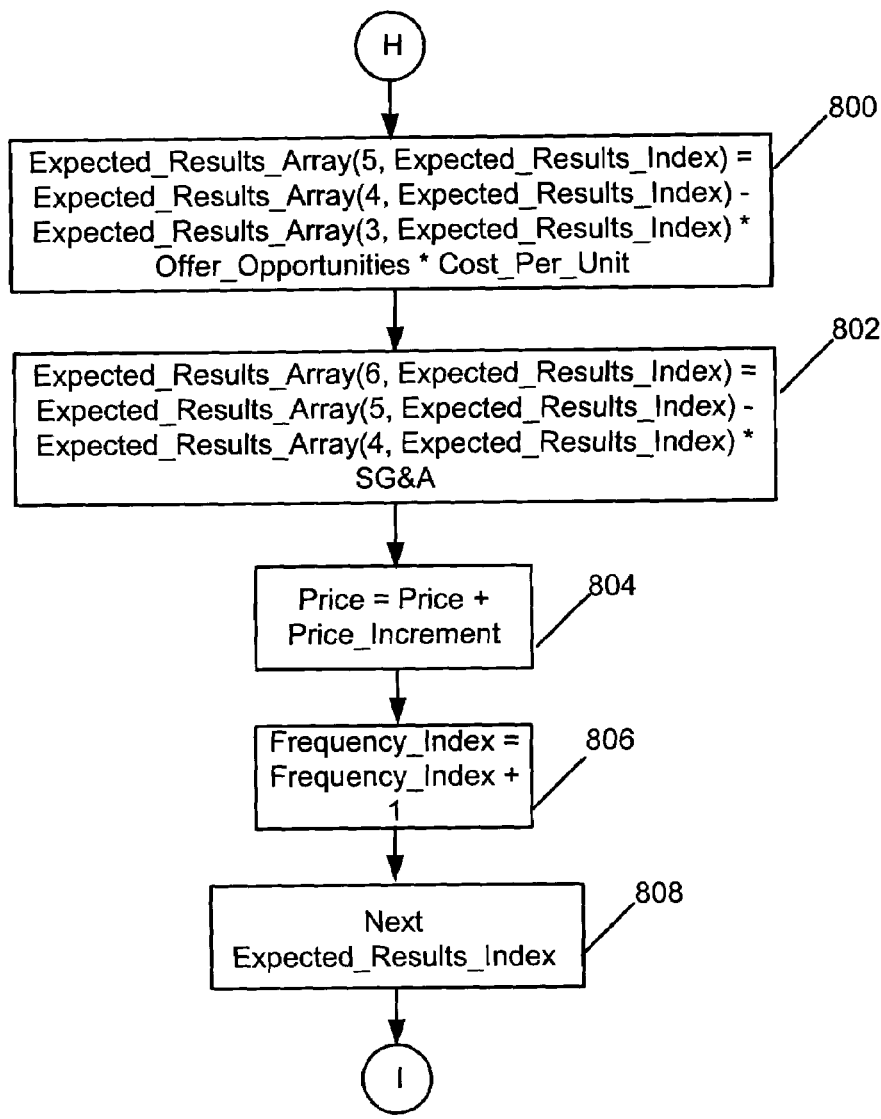
FIG. 8 is a continuation of the flow chart illustrating the creation of the Expected Results Array.

FIG. 8 shows the continuation of the flow diagram that is part of the Expected Results Engine 119 referenced in FIG. 1. The value for Expected_Results_Array 800 column five is calculated and depicts the anticipated gross profit for a specific price based on the anticipated revenue and cost-of-goods. The value for Expected_Results_Array 802 column six is calculated and depicts the anticipated earnings before income tax. The value of Price 804 is incremented. The value of Frequency_Index 806 is incremented. The value of Next_Expected_Results_Index 808 is incremented and the loop 618 repeated until Expected_Results_End_Index plus one is reached.

Figure 9:
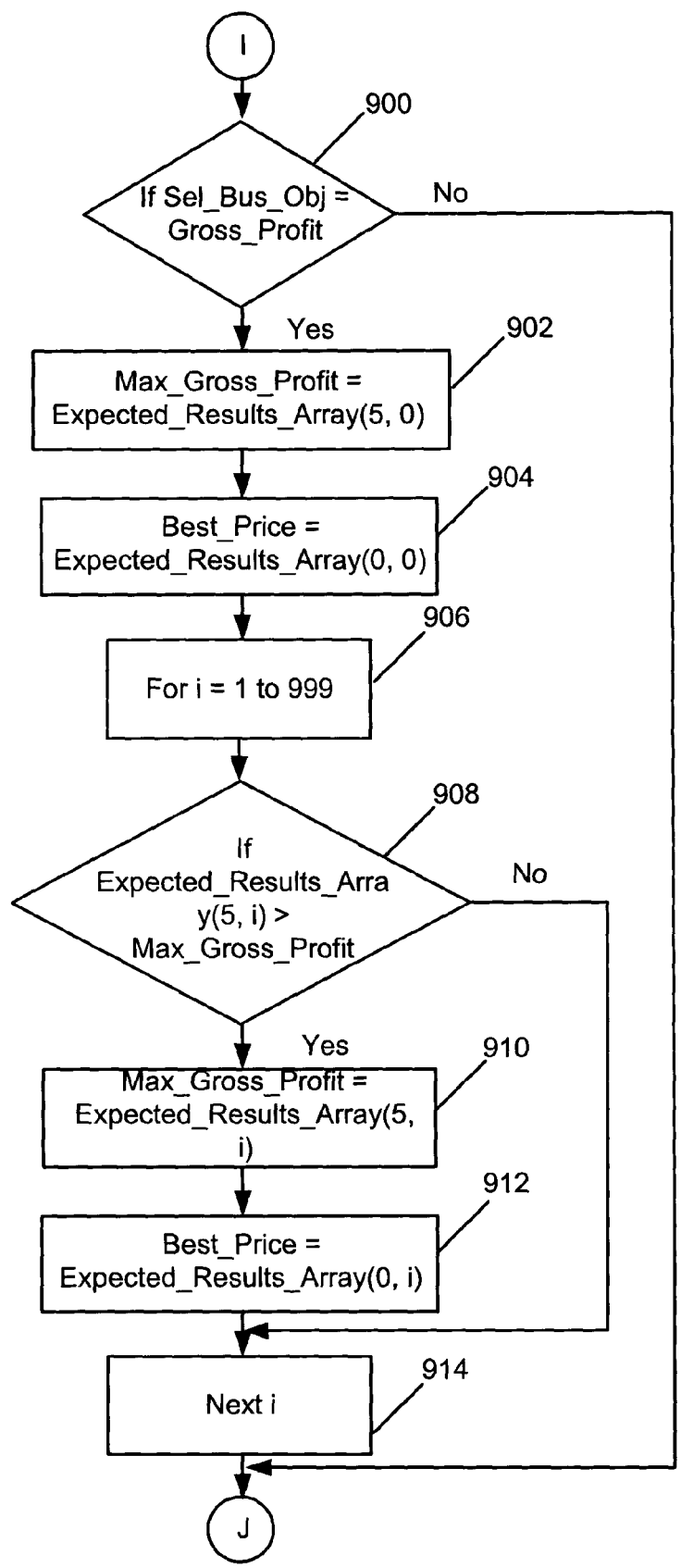
FIG. 9 is a flowchart that illustrates the selection of the optimum price that maximizes gross profit.

FIG. 9 shows the flow diagram of the routine that is responsible for identifying the optimum price. A determination 900 of the type of optimization desired by the user is made. If the determination 900 is that gross profit is to be maximized, then the first element of column five of the Expected_Results_Array 902 is stored in variable Max_Gross_Profit 902. The value of the first element of column zero of Expected_Results_Array 902 is stored in the variable Best_Price 904.

A loop 906 is established where i is initialized to one and incremented by one to 1000. A determination 908 is made as to whether the next sequential value for gross profit contained in Expected_Results_Array 908 exceeds the value stored in Max_Gross_Profit 908. If the determination 908 is true, then the sequential value of gross profit stored in Expected_Results_Array 908 is stored in the variable Max_Gross_Profit 910 and the corresponding value of for price stored in Expected_Results_Array 912 stored in the variable Best_Price. The value of i 914 is incremented and the loop 906 repeated until 1000 is reached. If the determination 908 is false, then the value of i 914 is incremented and the loop 906 repeated until 1000 is reached.

Figure 10:
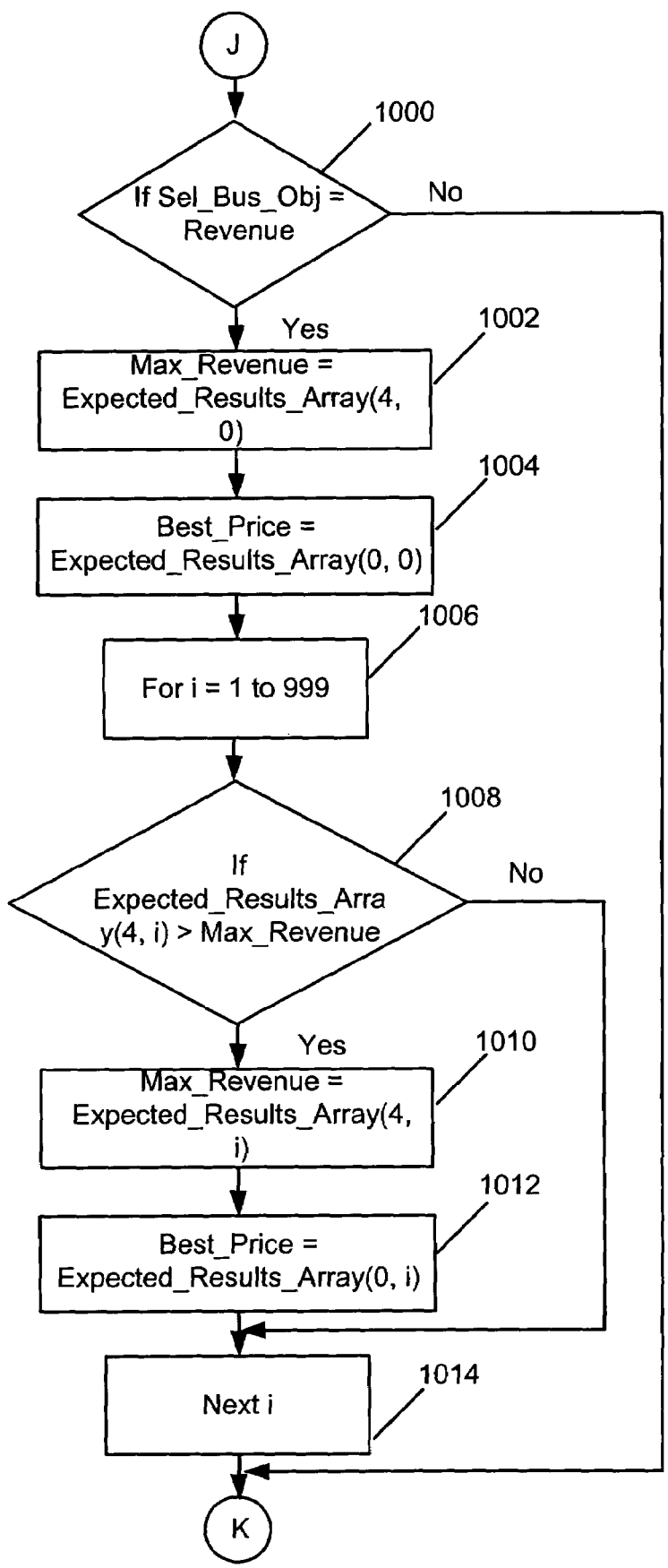
FIG. 10 is a flowchart that illustrates the selection of the optimum price that maximizes revenue.

FIG. 10 shows a continuation of the flow diagram of the routine that is responsible for identifying the optimum price. A determination 1000 of the type of optimization desired by the user is made. If the determination 1000 is that revenue is to be maximized, then the first element of column four of the Expected_Results_Array 1002 is stored in variable Max_Revenue 1002. The value of the first element of column zero of Expected_Results_Array 1004 is stored in the variable Best_Price 1004.

A loop 1006 is established where i is initialized to one and incremented by one to 1000. A determination 1008 is made as to whether the next sequential value for revenue contained in Expected_Results_Array 1008 exceeds the value stored in Max_Revenue 1008. If the determination 1008 is true, then the sequential value of gross profit stored in Expected_Results_Array 1008 is stored in the variable Max_Revenue 1010 and the corresponding value of for price stored in Expected_Results_Array 1012 stored in the variable Best_Price. The value of i 1014 is incremented and the loop 1006 repeated until 1000 is reached. If the determination 1008 is false, then the value of i 1014 is incremented and the loop 1006 repeated until 1000 is reached.

Figure 11:
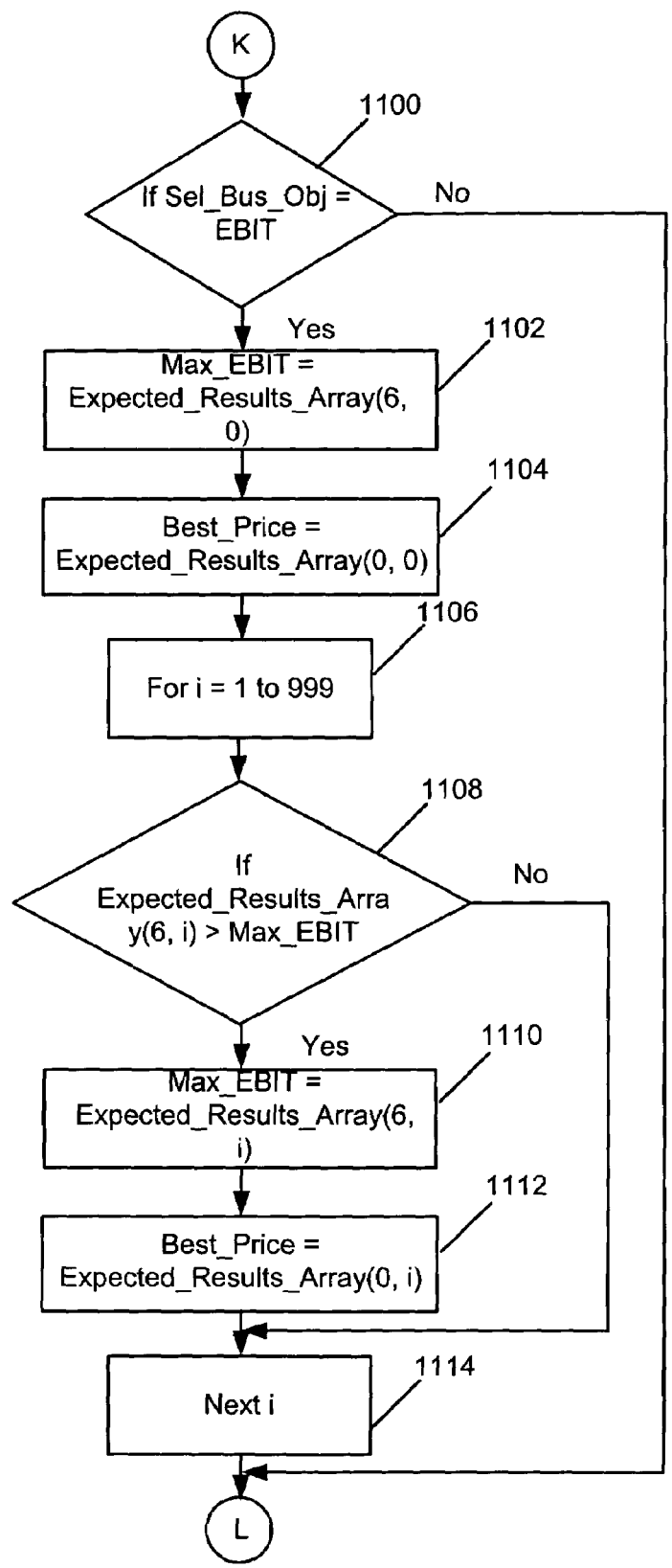
FIG. 11 is a flowchart that illustrates the selection of the optimum price that maximizes earnings before income tax.

FIG. 11 shows a continuation of the flow diagram of the routine that is responsible for identifying the optimum price. A determination 1100 of the type of optimization desired by the user is made. If the determination 1000 is that earnings before income tax (EBIT) is to be maximized, then the first element of column six of the Expected_Results_Array 1102 is stored in variable Max_EBIT 1102. The value of the first element of column zero of Expected_Results_Array 1104 is stored in the variable Best_Price 1104.

A loop 1106 is established where i is initialized to one and incremented by one to 1000. A determination 1108 is made as to whether the next sequential value for earnings before income tax contained in Expected_Results_Array 1108 exceeds the value stored in Max_EBIT_1108. If the determination 1108 is true, then the sequential value of earnings before income tax stored in Expected_Results_Array 1108 is stored in the variable Max_EBIT 1110 and the corresponding value of for price stored in Expected_Results_Array 1112 stored in the variable Best_Price. The value of i 1114 is incremented and the loop 1106 repeated until 1000 is reached. If the determination 1108 is false, then the value of i 1114 is incremented and the loop 1106 repeated until 1000 is reached.

Figure 12A:
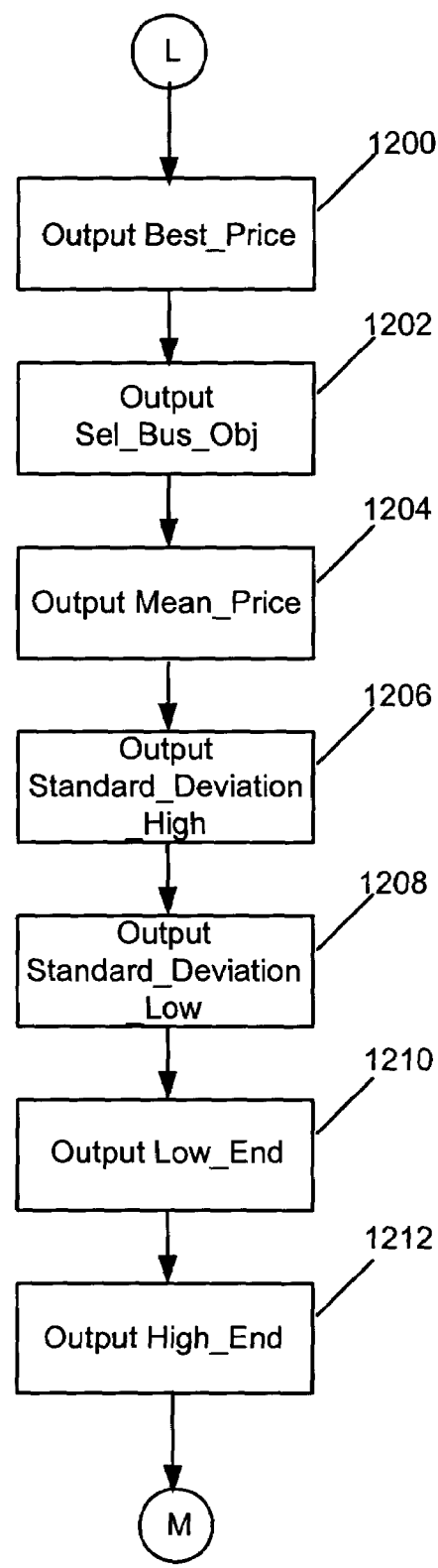
FIG. 12A is a flowchart that illustrates the outputting of data to the input/display device.
Figure 12B:
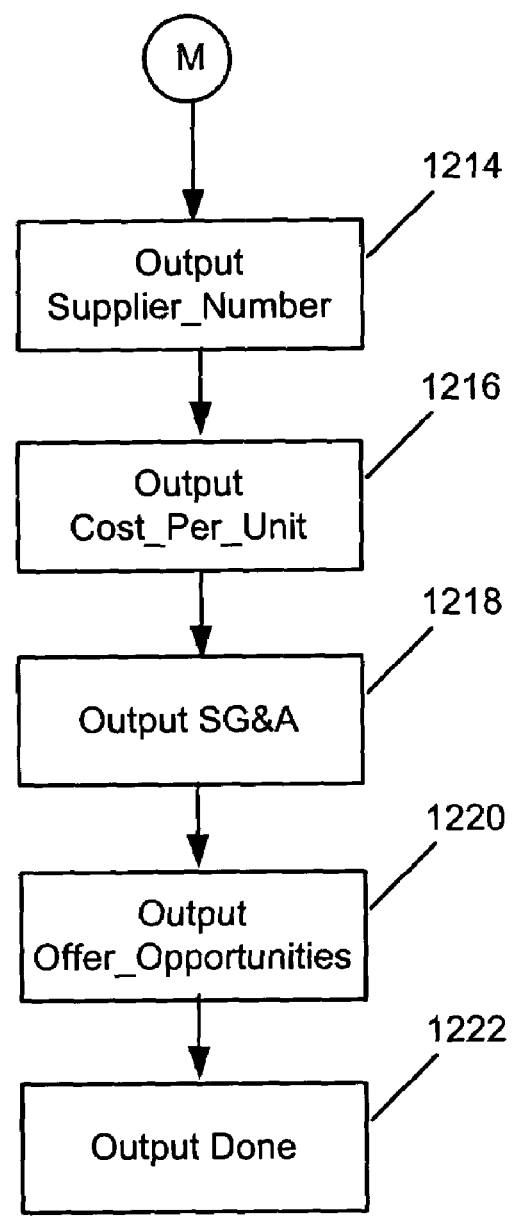
FIG. 12B is a flowchart that illustrates the outputting of data to the input/display device.

FIG. 12 and FIG. 12B shows a flow diagram of the routine responsible for displaying the optimum price and associated characteristics of the business and market. Best_Price 1200, Sel_Bus_Obj 1202, Mean_Price 1204, Standard_Deviation_High 1206, Standard_Deviation_Low 1208, Low_End 1210, High_End 1212, Supplier_Number 1214, Cost_Per_Unit 1216, SG&A 1218, Offer_Opportunities 1220 are sent to the display menu. Step 1222 completes the routine.

Figure 13:
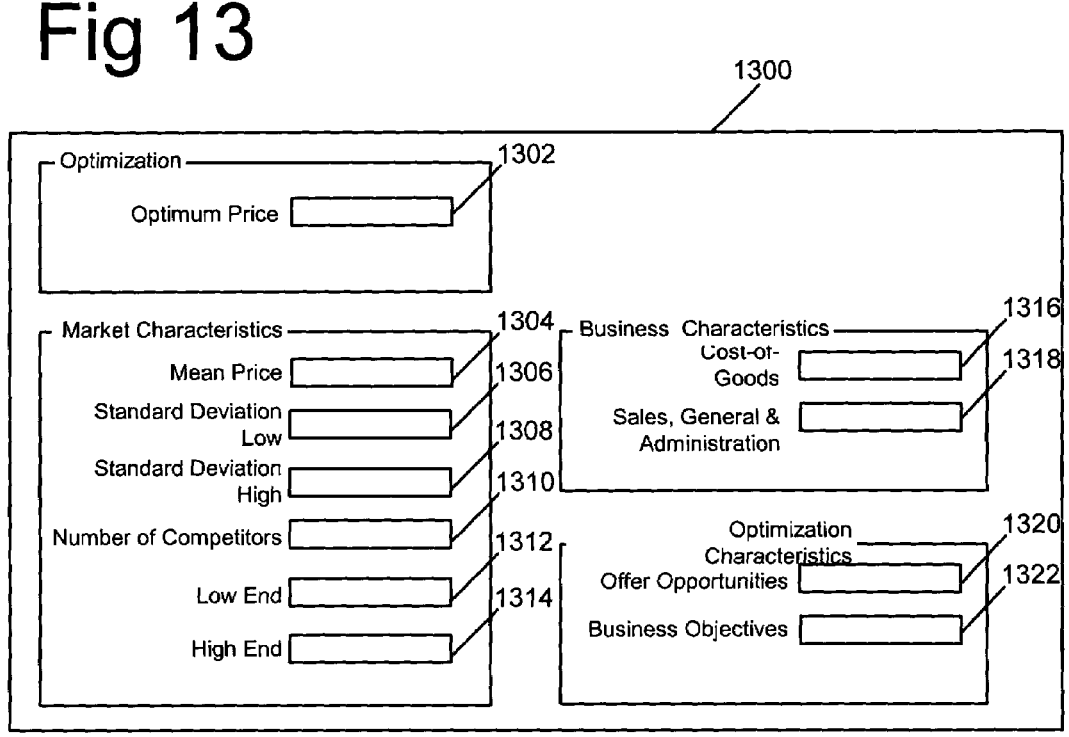
FIG. 13 is an output menu that can display the results of the optimization as well as the input data.

FIG. 13 is an output display menu 1300 that appears on the user's input/display device 100. The value for Best_Price is displayed in the Optimum Price 1302 field. The value for Mean_Price is displayed in the Mean Price 1304 field. The value for Standard_Deviation_Low is displayed in the Standard Deviation Low 1306 field. The value for the Standard_Deviation_High is displayed in the Standard Deviation High 1308 field. The value for the Supplier_Number is sent to the Number of Competitors 1310 field. The value for Low_End is sent to the Low End 1312 field. The value for High End is sent to the High End 1314 field. The value of Cost_Per_Unit is sent to the Cost-of-Goods 1316 field. The value of SG&A is sent to the Sales & General Administration 1318 field. The value of Offer_Opportunities is sent to the Offer Opportunities 1320 field. The value of the Sel_Bus_Obj is sent to the Business Objective 1322 field.

The present embodiment provides a superior computer implemented method for pricing goods and services so that certain business objectives are met. The technique overcomes the three principal challenges of the prior art. In addition, the present embodiment adds a significant enhancement that mitigates the uncertainty in implicit assumptions associated with the prior art.

The method begins by a user creating an estimated Frequency vs. Price mathematical distribution (which could be used to generate a curve) for the subject market. This curve represents the user's estimate of the frequency of competitor's offers at each price for similar goods and services.

The Frequency vs. Price distribution curve is converted to a Probability of Win vs. Price curve by integrating the area under the Frequency vs. Price distribution curve. The Probability of Win vs. Price curve is adjusted based on the number of competitors.

Using the Probability of Win vs. Price curve, the number of units sold can be predicted based on a number of offer opportunities. Offer opportunities are the instances in a given time period that a supplier has to sell their goods or services. How offer opportunities are quantified may differ from industry-to-industry. For example, an industrial distributor [supplier] may sell their goods through a request-for-quote/bid model. Offer opportunities in this instance consist of the number of bids the distributor submitted to potential customers in a given time period. Another example is a grocer. If the grocer wanted to understand the market's responsiveness to a particular type of cereal, the offer opportunities could be defined as the number of overall sales for all cereals.

As with the prior art, using the understanding of the relationship between quantity and price, an income statement, as well as additional metrics, can be constructed for each price through the following steps; a) Calculation of revenue by multiplying the price and quantity, b) Determination of the cost-of-goods by multiply the quantity and unit cost at that quantity, c) Calculation of gross profit by subtracting the cost-of-goods from the revenue, d) Determining the sales and general administration costs, e) Calculating the earnings before income tax by subtracting the sales and general administration costs from the gross profit, f) Calculation of market share by dividing the quantity by the total quantity sold by all suppliers, and e) Calculating factor utilization by dividing the units sold by the capacity of the factory for that product. Once the income statement and additional metrics are calculated for each price, the optimum price can be selected to satisfy one or more business objects.

The creation of the Probability of Win curve solves the four challenges of the prior art and substantially mitigates the uncertainty of implicit assumptions in the following ways:

a) Provides a complete representation of a market's responsiveness to pricing rather than the limited view provided by the supplier's historical sales orders.

b) Overcomes the absence of statistically relevant data that hinders the rendition of a demand curve.

c) Ensures market relevancy by using an expert's view of the market rather than relying on historical sales order data that may not be relevant in predicting the market's responsiveness.

d) Mitigates the weight on the assumption that the market remains the same by creating a metric called offer opportunities through which sales opportunities may be gauged.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A computer-implemented method for determining an optimal price, comprising:

receiving a plurality of prices associated with a price-frequency mathematical distribution of competitor prices, utilizing an input device of a computer system;

receiving a number of competitors, utilizing the input device of the computer system;

receiving a business objective which is selected from the group consisting of maximizing revenue for the good or service, maximizing gross profit for the good or service, maximizing factory utilization for the good or service, achieving a market share goal for the good or service, and maximizing earnings before income tax (EBIT) for the good or service, utilizing the input device of the computer system;

receiving a cost associated with a good or service, utilizing the input device of the computer system;

calculating an optimal price based on the prices, number of competitors, business objective, and cost associated with a good or service, utilizing a processor coupled to the input device of the computer system; and outputting the optimal price for performing the business objective, utilizing an output device coupled to the processor of the computer system.

2. The method as recited in claim 1, wherein the price-frequency mathematical distribution includes a price-frequency mathematical curve.

3. The method as recited in claim 1, wherein the plurality of prices include a highest frequency price.

4. The method as recited in claim 1, wherein the plurality of prices include a mean price.

5. The method as recited in claim 1, wherein the plurality of prices include a standard deviation low price.

6. The method as recited in claim 1, wherein the plurality of prices include a standard deviation high price.

7. The method as recited in claim 1, wherein the plurality of prices include a price associated with a beginning of the price-frequency mathematical distribution.

8. The method as recited in claim 1, wherein the plurality of prices include a price associated with an end of the price-frequency mathematical distribution.

9. The method as recited in claim 1, and further comprising receiving a sales and administration cost, utilizing the input device.

10. The method as recited in claim 9, wherein the business objective includes maximizing earnings before income tax (EBIT) for the good or service.

11. The method as recited in claim 1, wherein the calculating is carried out utilizing a frequency distribution engine, a probability of win engine, an expected results engine.

12. The method as recited in claim 1, wherein the calculating further includes adjusting the probability of a customer purchase based on the number of competitors.

13. A method as recited in claim 12, wherein each price, probability of a customer purchase, and cost-per-unit are used to form an income/operational statement for each member of a plurality of prices.

14. A method as recited in claim 12, wherein each income/operational statement is comprised of financial and operational terms including revenue, cost-of-goods, gross profit, factory utilization, and market penetration.

15. A method as recited in claim 12, wherein a set of the income/operational statements are stored within a table.

16. A method as recited in claim 13, wherein a maximum revenue value, a maximum profit value, a plurality of factory utilization values, and the market penetration value corresponding to a market penetration goal are identified along with corresponding prices.

17. The method as described in claim 16, wherein the optimal price satisfying the selected objectives is identified.

18. A method as recited in claim 1, wherein a graphical user interface is included for inputting the competitor prices and the number of competitors.

19. A method as recited in claim 18, wherein the graphical user interface is adapted for inputting the business objective.

20. A method as recited in claim 19, wherein the price-frequency mathematical distribution is used to estimate the competitor prices.

21. The method as described in claim 19, wherein the price-frequency distribution is estimated using the set of competitor prices.

22. The method as described in claim 19, wherein the price-frequency mathematical distribution is converted to an expected probability of a customer purchase based on the number of competitors.

23. A method as recited in claim 19, wherein the price-frequency mathematical distribution is converted to a table of prices with a frequency of a price within the table corresponding to the price-frequency mathematical distribution.

24. A method as recited in claim 23, wherein each price, probability of a customer purchase, and cost-per-unit are used to form an income/operational statement for each member of a plurality of prices.

25. A method as recited in claim 24, wherein each income/operational statement is comprised of financial and operational terms including revenue, cost-of-goods, gross profit, factory utilization, and market penetration.

26. A method as recited in claim 25, wherein a set of the income/operational statements are stored within a table.

27. A method as recited in claim 26, wherein a maximum revenue value, a maximum profit value, a plurality of factory utilization values, and the market penetration value corresponding to a market penetration goal are identified along with corresponding prices.

28. The method as described in claim 27, wherein the optimal price satisfying the selected objectives is identified.

29. A computer program product embodied on a computer readable medium for determining an optimal price, comprising:
   computer code for receiving a plurality of prices associated with a price-frequency mathematical distribution of competitor prices;
   computer code for receiving a number of competitors;
   computer code for receiving a business objective which is selected from the group consisting of maximizing revenue for the good or service, maximizing gross profit for the good or service, maximizing factory utilization for the good or service, achieving a market share goal for the good or service, and maximizing earnings before income tax (EBIT) for the good or service;
   computer code for receiving a cost associated with a good or service;
   computer code for calculating an optimal price based on the prices, number of competitors, business objective, and cost associated with the good or service; and
   computer code for outputting the optimal price;
   wherein the computer code is executed on a computer for aiding in the performance the business objective.

30. A system for determining an optimal price, comprising:
   an input device for receiving a plurality of prices associated with a price-frequency mathematical distribution of competitor prices, a number of competitors, a business objective, and a cost associated with good or service, wherein the business objective is selected from the group consisting of maximizing revenue for the good or service, maximizing gross profit for the good or service, maximizing factory utilization for the rood or service, achieving a market share coal for the good or service, and maximizing earnings before income tax (EBIT) for the good or service;
   a processor including a plurality of engines, and coupled to the input device, the engines of the processor adapted for calculating an optimal price based on the prices, number of competitors, business objective, and cost associated with the good or service; and
   display device coupled to the processor for displaying the optimal price for performing the business objective.

* * * * *

UNITED STATES PATENT AND TRADEMARK OFFICE
CERTIFICATE OF CORRECTION

PATENT NO. : 7,191,157 B1
APPLICATION NO. : 10/644949
DATED : March 13, 2007
INVENTOR(S) : Abe It is certified that error appears in the above-identified patent and that said Letters Patent is hereby corrected as shown below:

In the claims:
Col. 12, line 37, please replace "rood" with --good--;
Col. 12, line 38, please replace "coal" with --goal--;
Col. 12, line 46, please replace "display" with --a display--.

Signed and Sealed this
Twelfth Day of July, 2011

David J. Kappos
*Director of the United States Patent and Trademark Office*